United States Patent [19]
Asoh et al.

[11] Patent Number: 5,359,946
[45] Date of Patent: Nov. 1, 1994

[54] COMBUSTION GAS PURIFYING METHOD, ACID GAS REMOVER INCLUDING CALCIUM COMPOUND TO REMOVE ACID GASES, AND INCINERATOR EQUIPPED WITH SUCH ACID GAS REMOVER

[75] Inventors: Keisuke Asoh, Owariasahi; Akihiro Nagai, Aichi, both of Japan

[73] Assignee: Kabushiki Kaisha Daito, Aichi, Japan

[21] Appl. No.: 73,076

[22] Filed: Jun. 8, 1993

[51] Int. Cl.$^5$ .............................................. F23J 15/00
[52] U.S. Cl. .................................. 110/345; 110/344; 110/216; 422/180; 422/181; 423/244.07; 423/244.08
[58] Field of Search .............. 423/232, 244.08, 244.07; 422/180, 181; 110/344, 345, 216

[56] References Cited

U.S. PATENT DOCUMENTS

| | | | |
|---|---|---|---|
| 4,764,355 | 8/1988 | Romey et al. | 423/244.07 X |
| 4,792,440 | 12/1988 | Nielsen et al. | 423/244.07 |
| 5,215,724 | 6/1993 | Haerle | 422/180 |

*Primary Examiner*—Edward G. Favors
*Attorney, Agent, or Firm*—Oliff & Berridge

[57] ABSTRACT

A method of purifying combustion gases by removing acid gases therefrom, wherein a stream of combustion gases is caused to flow in contact with a surface of an acid gas remover formed from a mixture including a calcium compound for neutralizing said acid gases, and a binder for holding together particles of the calcium compound. Also disclosed is an incinerator incorporating the acid gas remover.

18 Claims, 7 Drawing Sheets

COMBUSTION GAS PURIFYING METHOD, ACID GAS REMOVER INCLUDING CALCIUM COMPOUND TO REMOVE ACID GASES, AND INCINERATOR EQUIPPED WITH SUCH ACID GAS REMOVER

BACKGROUND OF THE INVENTION

1. Field of the Invention

The present invention relates in general to a method of purifying combustion gases by removing or separating acid gases therefrom, a device for removing the acid gases, and an incinerator or a furnace having a function of purifying the combustion gases.

2. Discussion of the Related Art

Acid gases contained in combustion gases may be removed by a wet method or a dry method.

In the wet method, combustion gases are brought into contact with an alkali solution, so that acid gases contained in the combustion gases are absorbed by the alkali solution, and thus removed from the combustion gases.

In the dry method, the combustion gases are brought into contact with a solid alkali substance in the form of a powder or pellets, so that the acid gases react with the alkali substance, and are thereby removed from the combustion gases. For the combustion gases to be contacted with the alkali substance, a stream of combustion gases is introduced into a reaction device, in which a powdered or pulverized alkali substance is jetted into the combustion gas stream. Alternatively, the combustion gas stream is caused to flow through a container which is filled with a pelletized alkali substance.

The above methods known in the art to remove acid gases from the combustion gases, which use an alkali substance in the form of a solution, a powder or pellets, require an exclusive device for effecting a contact between the combustion gases and the acid gases, namely, a device adapted to inject an alkali solution or powder, or a container filled with a mass of alkali pellets. Accordingly, the equipment to remove the acid gases according to the above methods tend to be expensive.

In the art of removing the acid gases, it has been a long felt need to prolong an activity of reaction of alkali solution, powder or pellets with the acid gases. Since the reaction activity of the alkali substance is eventually lost as a result of neutralization of the alkali substance which reacted with the acid gases, the alkali solution used in the wet method is replaced with a fresh one when the solution is neutralized or saturated with the absorbed acid gases, or a mass of the powdered or pelletized alkali substance used in the dry method is replaced with a fresh one or changed into a reactive state, when the substance is neutralized or exhausted. An exclusive device is required to change the exhausted alkali solid into a reactive state.

SUMMARY OF THE INVENTION

It is therefore a first object of the present invention to provide a method of purifying combustion gases by removing acid gases, which may be practiced at a reduced cost.

It is a second object of the invention to provide an incinerator having a function of suitably practicing the above method.

It is a third object of this invention to provide an acid gas remover for removing acid gases from combustion gases, which has a prolonged period of reaction activity with respect to the acid gases.

The first object may be achieved according to one aspect of the present invention, which provides a method of purifying combustion gases by removing acid gases therefrom, wherein a stream of combustion gases is caused to flow in contact with a surface of an acid gas remover formed from a mixture including a calcium compound for neutralizing the acid gases, and a binder for holding together particles of the calcium compound.

The second object may be achieved according to a second aspect of the present invention, which provides an incinerator having a function of purifying combustion gases, having a combustion chamber, and a chimney for discharging the combustion gases produced in the combustion chamber, wherein the improvement comprises an acid gas remover formed from a mixture including a calcium compound for neutralizing the acid gases, and a binder for holding together particles of the calcium compound. The acid gas remover is disposed in a portion of a combustion gas passage between the combustion chamber and an outlet of the chimney, and has at least one opening through which a stream of the combustion gases flows.

The third object may be achieved according to a third aspect of this invention, which provides an acid gas remover for removing acid gases, which is formed from a mixture including a calcium compound for neutralizing the acid gases, and a binder for holding together particles of the calcium compound. The acid gas remover has at least one opening through which a stream of the combustion gases flows.

The opening or openings through which the combustion gases flow may be in the form of an aperture or apertures formed through the thickness of the acid gas remover. Where two or more acid gas removers are used in the form of a stack, the aperture or apertures may be formed by grooves formed in the adjacent acid gas removers of the stack.

The calcium compound used for neutralizing the acid gases may consist of at least one member selected from the group consisting of calcium hydroxide, calcium oxide and calcium carbonate. The binder may comprise at least one cement, such as a portland cement and a super-high-speed hardenable cement. Preferably, the acid gas remover is formed by using a mixture consisting of 40–70 wt. % of a calcium compound such as calcium hydroxide, and 25–65 wt. % of a binder including 15–35 wt. % of portland cement, 5–15 wt. % of super-high-speed hardenable cement and 5–15 wt. % of anhydrite. It is desirable to add 10–20 wt. % of glass fiber and 10–20 wt. % of additives, per 100 wt. % of the above mixture.

When the combustion gases including acid gases are brought into contact with the acid gas remover or a stack of acid gas removers (hereinafter referred to also as "remover"), the calcium hydroxide included in the remover reacts with the acid gases, whereby a calcium salt is produced as a neutral reaction product.

In use, the remover which is a formed article including the calcium compound and the binder is disposed in a portion of a combustion gas passage formed in an incinerator as described above, so that the combustion gases flowing through the passage are brought into contact with the remover. Accordingly, the remover does not requires an exclusive device for contacting the combustion gases with the remover, or an exclusive container or vessel for accommodating the remover.

The reaction between the calcium compound and the acid gases first takes place in the surface or skin portion of the remover, and progresses into the interior of the remover. The reaction product is produced in the surface portion of the remover, whereby the surface portion gradually becomes brittle and eventually collapses. That is, the reaction product and the binder neighboring the reaction product collapse, and are separated from the remaining portion of the remover. Thus, the fresh or still reactive calcium compound is exposed to the surface of the remover.

Although the reason or cause for the collapsing of the present remover has not been explicated, it is presumed that the remover will collapse in the following manner.

Where the acid gases contain hydrogen chloride, for example, a reaction between the hydrogen chloride and the calcium compound of the remover results in the production of calcium chloride. The volume of the produced calcium chloride which occupies a portion of the entire volume of the remover becomes larger than that of calcium hydroxide left in the remover. Consequently, the remover will expand and eventually collapse due to the volumetric expansion.

Where the acid gases contain hydrogen chloride while the calcium compound includes calcium hydroxide, an experiment confirmed an increase in the brittleness of the remover when the remover is first heated and then cooled.

More specifically, the heating of the remover causes a reaction of dehydration, thereby converting calcium hydroxide into calcium oxide, resulting in a decrease in the volume of the calcium hydroxide left in the remover. The subsequent cooling of the remover will cause the calcium oxide to absorb water, whereby the calcium oxide is converted into calcium hydroxide, thereby increasing the volume of the calcium hydroxide of the remover. The above volumetric change of the calcium hydroxide included in the remover appears to cause the remover to become brittle as a result of contact of the calcium hydroxide with hydrogen chloride.

The above two phenomena occur particularly predominantly adjacent the surface of the remover. Further, the remover tends to have stress concentration at its surface portion, due to contact with the adjacent remover or other neighboring component. In view of the above, it seems that the structural collapsing of the remover begins at its surface portion.

Since the present remover for removing acid gases can be disposed in a suitable portion of a combustion gas passage as described above, the equipment using the remover such as an incinerator does not require a conventionally required exclusive device for reaction of the calcium compound with the acid gases or for changing the neutralized calcium compound to a reactive state. Thus, the cost of the equipment can be accordingly lowered.

Further, the structural collapse beginning at the surface portion of the remover permits sequential exposure of the internal mass of the calcium compound for reaction with the acid gas, thereby assuring a continued activity of reaction with the acid gas.

In the case where the present remover is disposed in a combustion gas passage formed through an incinerator as described above, the acid gases contained in the combustion gases produced in the combustion chamber can be separated from the combustion gases, whereby the combustion gases discharged from the chimney of the incinerator can be purified, contributing to reduction in the environmental pollution. In this case, the remover is heated and then cooled when the incinerator is used, and easily collapses due to this thermal cycle.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
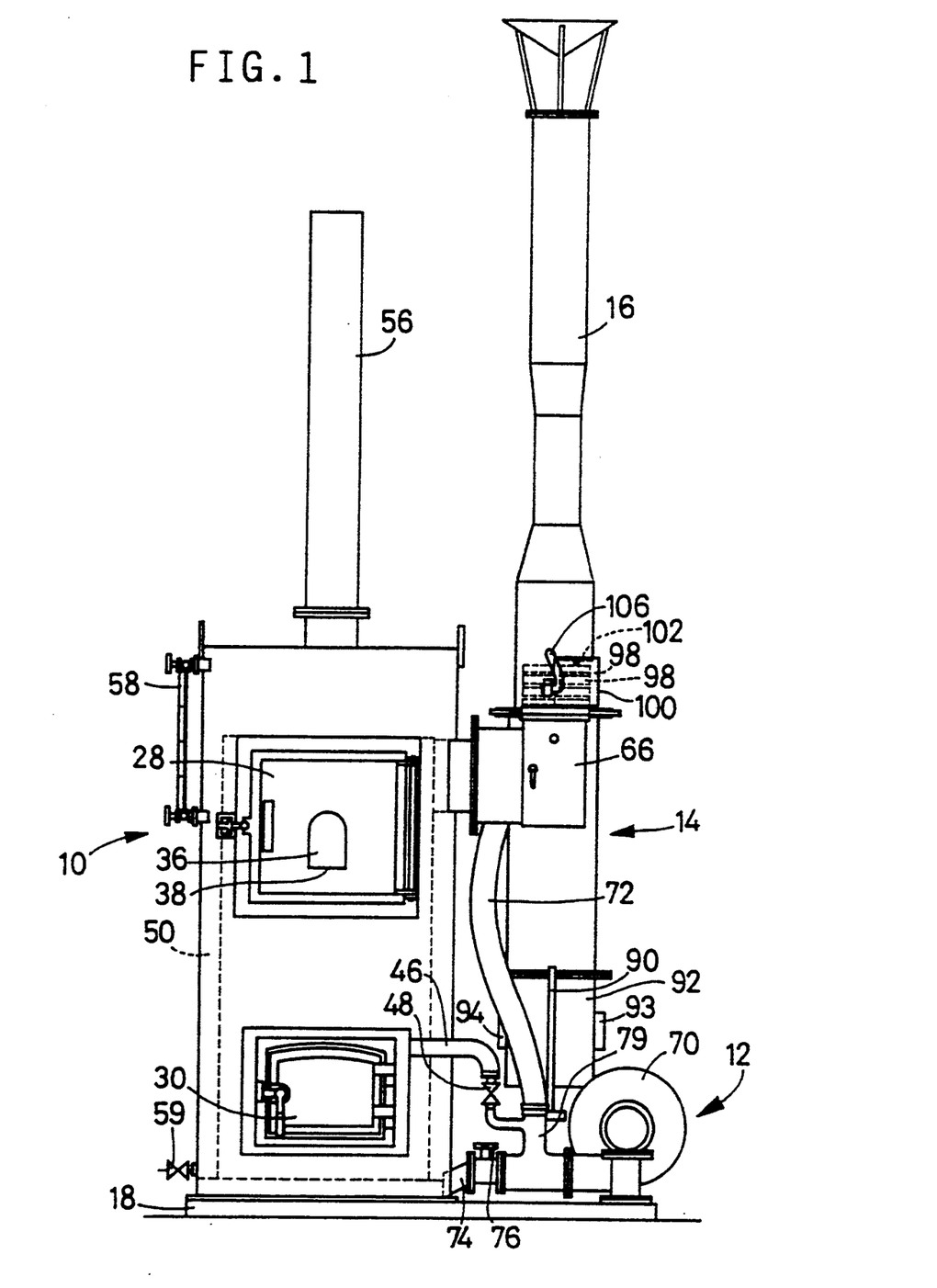
FIG. 1 is a front elevational view of an incinerator incorporating a stack of acid gas removers in the form of alkali filters constructed according to one embodiment of the present invention.
Figure 2:
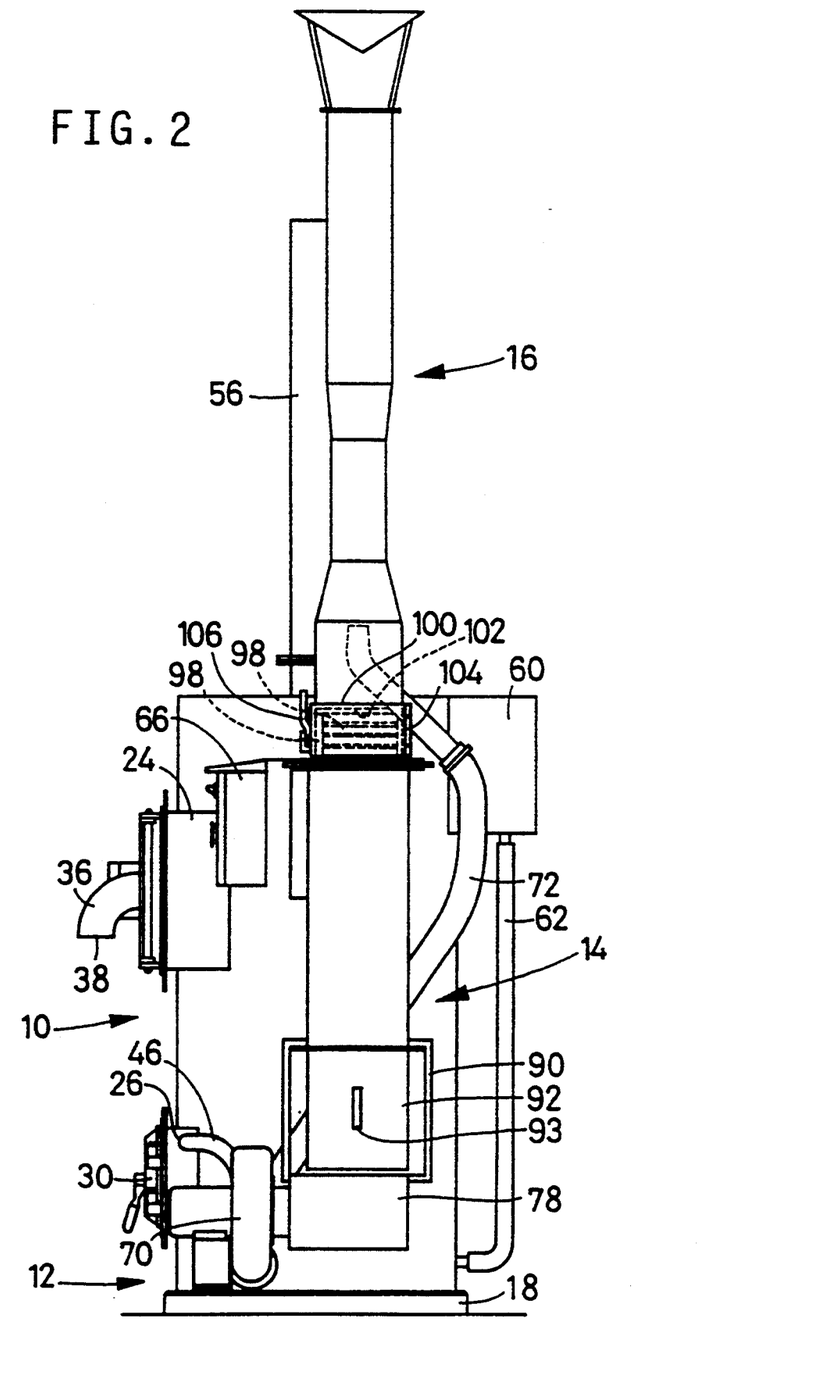
FIG. 2 is a side elevational view of the incinerator of FIG. 1.
Figure 3:
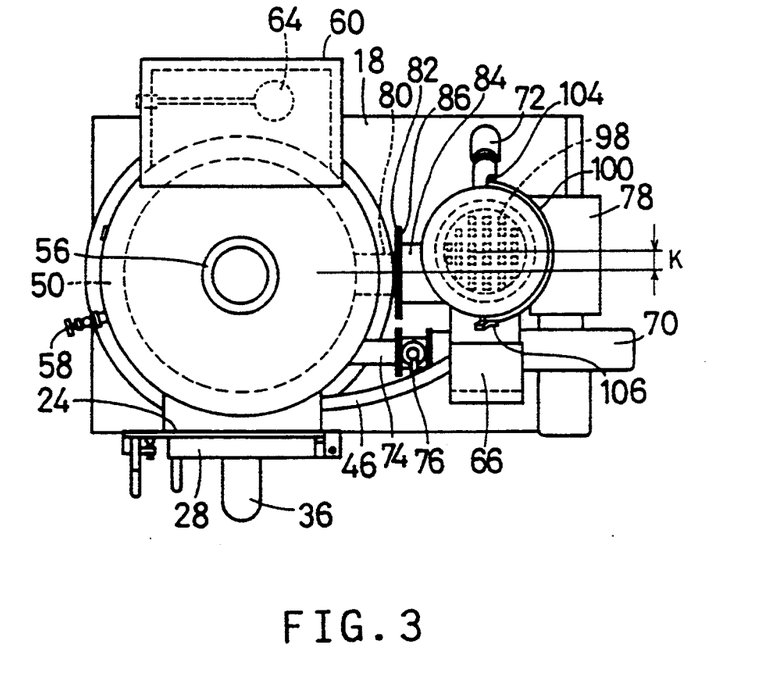
FIG. 3 is a plan view of the incinerator of FIG. 1.

Referring first to FIGS. 1-3, there is shown an incinerator wherein a stack of acid gas removers in the form of alkali filters each constructed according to one embodiment of this invention is disposed for removing acid gases.

The incinerator includes a cylindrical main body 10, an air blower device 12, a cyclone duct collector 14, and a chimney or funnel 16. The main body 10 and the air blower device 12 are fixedly mounted on a base 18, and the cyclone dust collector 14 is attached to the main body 10 and the air blower device 12, as described below. The chimney 16 is connected to the upper end of the cyclone dust collector 14. The chimney 16 has an outlet at its upper end.

As well known in the art, the main body 10 is divided by a grate into an upper combustion chamber and a lower ash chamber. The combustion and ash chambers are accessible through a refuse inlet 24 and an ash outlet 26, respectively. These inlet and outlet 24, 26 are provided with respective hinged doors 28, 30, which are opened to introduce a refuse or waste into the combustion chamber, and to discharge ashes out of the ash chamber, respectively.

An air duct 36 which is arcuately bent is attached to a central portion of the inlet door 28, such that a lower open end 38 of the duct 36 is open downward, as most clearly shown in FIG. 2. The air duct 36 is adapted to supply the ambient air into the combustion chamber while preventing combustion gases from flowing out of the combustion chamber. A blower duct 46 extending from the air blower device 12 is connected to the main body 10, at a position in the vicinity of an upper portion of the outlet door 30. This blower duct 46 communicates directly with the ash chamber, and with the combustion chamber through the grate disposed between the two chambers. The blower duct 46 is provided with a stop valve 48, which is opened to feed a stream of air from the blower device 12 into the combustion chamber of the main body 10, as needed.

The interior of the main body 10 is surrounded by an annular water cooler 50 filled with cooling water, to reduce the amount of heat radiated from the main body 10 whose outer circumference is defined by the cylindrical outer wall of the water cooler 50. The main body 10 is equipped with a steam exhaust pipe 56 extending upright from its top surface, so that a water vapor produced as a result of heating of the water in the water cooler 50 is discharged from the main body 10 through the exhaust pipe 56. The main body 10 is also equipped with a water level gage 58 at an upper part of the water cooler 50, and a drain valve or cock 59 near the bottom of the water cooler 50.

To the outer wall of the main body 10, there is secured a water reservoir 60 which is connected to the water cooler 50 by a water duct 62, to fill the water cooler 50 with a volume of water supplied from the reservoir 60. The water reservoir 60 is provided with a float 64 adapted to detect the water level therein.

On on the cyclone dust collector 14, there is provided an operator's control panel 66, which includes a buzzer that is activated when the water level in the reservoir 60 has dropped below a predetermined level.

The air blower device 12 includes a blower 70, blower ducts 46, 72, 74, an air control valve 76, and a motor 78 to drive the blower 70. The motor 78 is controllable through the operator's control panel 66.

Each of the blower ducts 47, 72, 74 is connected at one end thereof to an air chamber 79 which communicates with the blower 70. Streams of air are fed into the ash chamber of the main body 10 through the ducts 46, 74, and into the chimney 16 through the duct 72. The amounts of flow of the air streams through the blower ducts 46, 72, 74 are adjustable by the air control valve 76. The amounts of flow of the air streams through the ducts 46, 72 decrease as the air control valve 76 is operated toward its open position, and increases as it is operated toward its closed position. The direction of change in the amount of flow of the air stream through the duct 74 is reversed with respect to that of the ducts 46, 72.

The function of the chimney 16 of discharging the combustion gases is improved by introducing a stream of air from the air blower device 12.

As shown in FIG. 3, a connector passage 80 extends through an upper part of the outer wall of the main body 10, and is provided with a connector flange 82 at its outer end, while a connector passage 84 extends from the cyclone dust collector 14 and is provided with a connector flange 86, at its end remote from the collector 14. These two connector passages 80, 84 are connected together at their connector flanges 82, 86, such that the center lines of the passages 80, 84 are offset from the center of the dust collector 14, by a distance K as indicated in FIG. 3.

To the lower end portion of the cyclone dust collector 14, there is attached a frame 90 which rests on the motor 78 of the air blower device 12. An ash container 90 is removably received within the frame 90. This ash container 90 is provided with two knobs 93, 94 on its front and rear surfaces, as most clearly shown in FIG. 1. These knobs 93, 94 facilitate installation, removal and transportation of the ash container 92.

The chimney 16 fixed to the top of the cyclone dust collector 14 accommodates a stack of four acid gas remover in the form of alkali filters 98 in its lower end portion in which the temperature rises above 500° C. when the incinerator is in operation. This temperature is high enough to assure a sufficient degree of reaction between calcium hydroxide included in the alkali filters 98 and hydrogen chloride contained in acid gases included in the combustion gases produced in the main body 10. Therefore, the lower end portion of the chimney 16 is a suitable position of installation of the stack of alkali filters 98.

The lower end portion of the chimney 16 has an opening 103, and a closure door 100 which is pivotally supported by a hinge 104, so as to close and open the opening 102. The door 100 permits an access to the lower portion of the chimney 16, for installing the stack of alkali filters 98 therein. The hinged door 100 is locked in its closed position by a latch 106. The lower end portion of the chimney 16 has a larger inside diameter than the inside diameter of the upper open end of the cyclone dust collector 14, whereby an annular shoulder surface lying in the horizontal plane is formed at the connection between the chimney 16 and the dust collector 14. The stack of alkali filters 98 is installed in the chimney 16, such that the outer peripheral portion of the stack rests on the above-indicated shoulder surface which faces upward.

Figure 4:
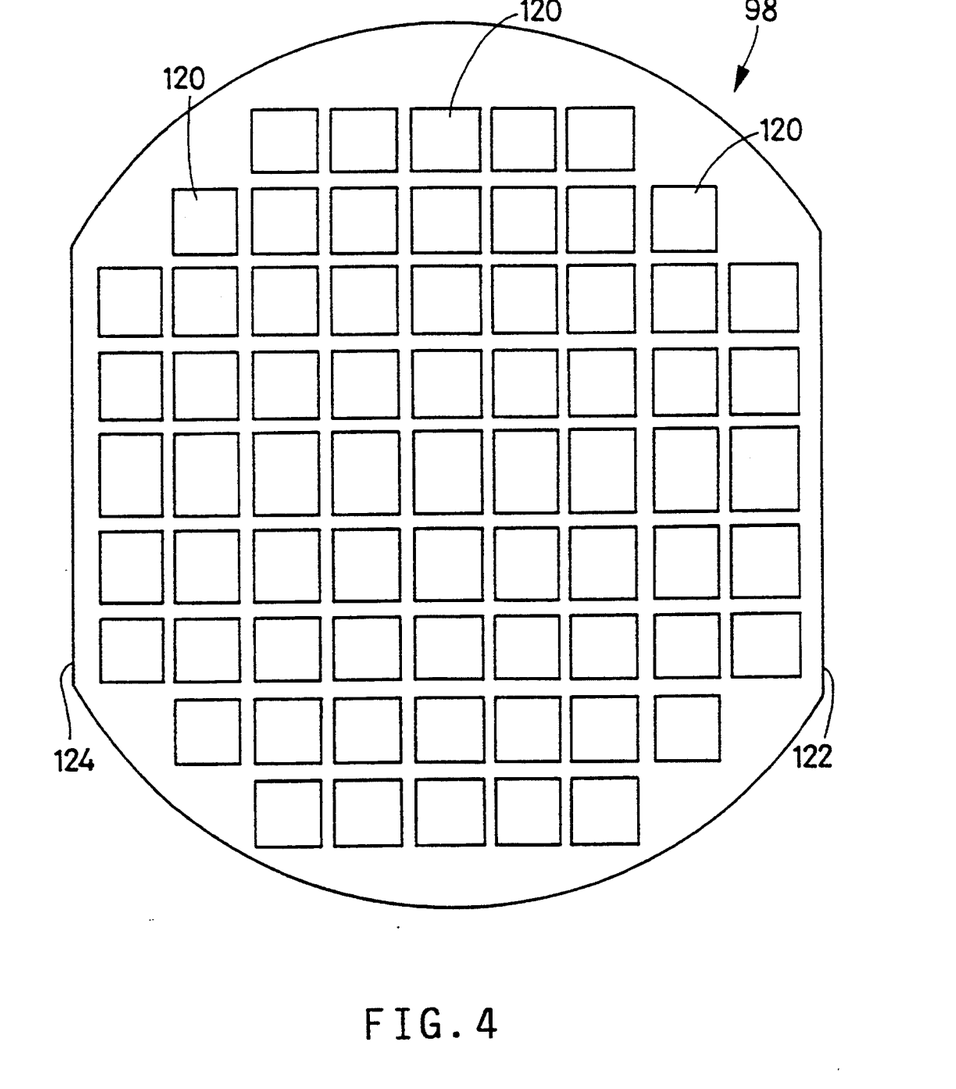
FIG. 4 is a plan view of one of the alkali filters incorporated in the incinerator of FIG. 1.

As shown in FIG. 4, each alkali filter 98 is a planar member of a generally disk-like shape, having a multiplicity of openings in the form of apertures 120 formed through its thickness so as to extend in its axial direction. The apertures 120 have a square cross sectional shape as seen in FIG. 4. The four sides of each square aperture 120 have a length of about 16 mm. The alkali-filter 98 has two parallel cutouts 122, 124 which provide two opposed flat side faces. These cutouts 122, 124 provide spaces between the periphery of the filter 98 and the periphery of the opening 102 (and the inner wall surface of the chimney 16), and thereby permit the user to finger-grasp the filter 98, without an interference with the periphery of the opening 102 or the inner wall surface of the chimney 16, when the filter 98 is installed in the chimney 16.

The inside diameter of the lower portion of the chimney 16 is 216 mm while the outside diameter of each alkali filter 98 is about 190 mm. Therefore, substantially the entire volume of the combustion gases flowing through the chimney 16 contacts the stack of alkali filters 98. The axial dimension or thickness of each alkali filter 98 is about 50 mm.

Each alkali filter 98 is formed by extrusion into a shape as illustrated in FIG. 4, using, for example, a mixture which consists essentially of 65 wt. % of a calcium compound in the form of calcium hydroxide, 15 wt. % of a portland cement (ordinary cement), 10 wt. % of a super-high-speed hardenable cement, and 10 wt. % of an anhydrite. The last three elements (cements and anhydrite) are used as a binder for holding together the particles of calcium hydroxide in an extruded body, and enabling the extruded body to maintain its shape. In the present embodiment, 20 wt. % of a glass fiber, 10 wt. % of an additive and water are added to 100 wt. % of the above mixture. The additive is a material effective to improve the heat resistance of the filter 98 and/or the formability of the above mixture. For instance, aluminum metaphosphate and/or calcium borate may be used for improved heat resistance of the alkali filter, and a suitable agent such as "Kao Mighty 100" (trade name) available from Kao Soap Co. (Japan) may be used for reducing an amount of water required to prepare a slurry of the above mixture to be used for extruding the alkali filter.

Usually, two or more filters 98 may be obtained from each extruded body prepared from the above mixture. The extruded body is cut into the individual filters, which are dried in air or in a steam.

When the combustion gases including acid gases pass through the stack of alkali filters 98 in the chimney 16, the calcium hydroxide included in the alkali filters 98 reacts with the acid gases, whereby a calcium salt is produced as a reaction product. Although the reaction activity of the alkali filters 98 with the acid gases is less than that of calcium hydroxide per se in the form of a powder mass, the reaction activity of the filters 98 continues for a longer period of time due to gradual structural collapse of the filters 98 during use.

While an exact analysis on the reason or cause for the collapsing of the alkali filters 98 has not been made, it is presumed that the filters 98 will collapse in the following process.

A reaction between calcium hydroxide and hydrogen chloride results in the production of calcium chloride, according to the following reaction formula:

$$Ca(OH)_2 + 2HCl \rightarrow CaCl_2 + 2H_2O$$

The volume of the produced calcium chloride which partially occupies the volume of the alkali filters 98 becomes larger than that of calcium hydroxide left in the alkali filters 98, whereby the production of calcium chloride causes volumetric expansion of the alkali filters 98.

On the other hand, heating of the alkali filters 98 causes a reaction of dehydration, thereby converting calcium hydroxide into calcium oxide, as indicated below.

$$Ca(OH)_2 \rightarrow CaO + H_2O$$

Therefore, the volume of calcium oxide produced in the alkali filters 98 becomes smaller than that of calcium hydroxide left in the filters 98. Subsequent cooling of the filters 98 causes the calcium oxide to absorb water, thereby producing calcium hydroxide, as indicated below.

$$CaO + H_2 \rightarrow Ca(OH)_2$$

Since the volume of the thus produced calcium hydroxide is larger than that of the calcium oxide, the above reactions first cause contraction of the filters 98 and then expansion of the same.

The expansion and contraction of the alkali filters 98 for the two reasons described above tend to cause the filters 98 to become brittle. Since the reaction of the filters 98 with hydrogen chloride takes place particularly vigorously near the surface or skin of the filters 98, the filters 98 become brittle particularly at their surface or skin portions exposed heavily to hydrogen chloride. Consequently, the filters 98 will collapse primarily at their surface portions, whereby calcium chloride produced from the calcium hydroxide in the surface portions is removed from the filters 98, together with the binder such as portland cement. As a result of this surface collapse of the filters 98, still reactive calcium hydroxide is exposed for reaction with hydrogen chloride.

An experiment confirmed that the alkali filters 98 collapsed due to conversion of calcium hydroxide into calcium chloride. It is considered that the production of other reaction products due to reaction between calcium hydroxide and the acid gases other than hydrogen chloride contributes to a structural collapse of the filters 98, for the same reasons as described above with respect to hydrogen chloride.

In theory, therefore, it is considered that the alkali filters 98 will collapse due to their volumetric expansion, which arises because the volume of the reaction products present in the filters 98 is larger than the volume of the calcium hydroxide which reacted with the acid gases. For instance, the production of calcium sulfate ($Ca(SO_4)$) or calcium nitrate ($Ca(NO_3)_2$) as a result of a reaction of calcium hydroxide with sulfur dioxide or nitrogen dioxide will eventually result in collapsing the filters 98, since the volume of calcium sulfate or calcium nitrate is larger than that of calcium hydroxide.

In any event, the alkali filters 98 will collapse at their surface portions as a result of a reaction product produced by reaction of calcium hydroxide in the filters 98 with at least one acid gas contained in the combustion gases. This structural collapse makes it possible to keep calcium hydroxide exposed on the surfaces of the filters 98, so that the calcium hydroxide is always able to react with the acid gases such as nitrogen dioxide, nitrogen monoxide and other nitrogen oxides NOx, sulfur dioxide, hydrogen sulfide and other sulfides, hydrogen fluoride and other fluorides, and dioxin, whereby these acid gases may be effectively removed or separate from the combustion gases.

In the incinerator constructed as described above, the combustion gases produced during burning of a waste or refuse within the combustion chamber of the main body 10 are first admitted into the cyclone dust collector 14, then passed through the stack of alkali filters 98 in the lower end portion of the chimney 16, and finally discharged through the chimney 16.

During flowing of the combustion gases through the dust collector 14, dust contained in the combustion gases is removed from the gases by the collector 14, and the acid gases are removed from the combustion gases by the alkali filters 98. Accordingly, the amounts of the dust and acid gases contained in the combustion gases discharged from the chimney 16 are considerably reduced, to thereby avoid environmental pollution by the combustion gases emitted from the incinerator equipped with the filters 98.

Further, the stack of filters 98 can assume its shape by itself, without a need of any support member, and can be placed in stack on the shoulder surface at the interface between the upper end of the dust collector 14 and the lower end of the chimney 16. The stack of filters 98 does not require an exclusive device for the sole purpose of causing a reaction with the acid gases.

The fragmentary or particulate material produced as a result of collapsing of the filters 98 falls by gravity, and is collected by the dust collector 14 and stored in the ash container 92, for easy removal out of the incinerator. Further, the material removed from the filters 98 will not disturb a smooth flow of the combustion gases through the collector 14 and chimney 16.

In the illustrated embodiment, the stack of filters 98 consists of four filters. The use of a plurality of filters 98 superposed on each other in a stack prolongs the total reaction time of calcium hydroxide with hydrogen chloride, as needed, as compared with the reaction time when a single filter 98 is used. In this respect, the provision of the multiple apertures 120 formed through each filter 98 is effective to minimize a pressure loss of the combustion gases, even where two more filters 98 are used.

It is also noted that the lowermost filter 98 of the stack will react with the acid gases more actively than the other or upper filters 98, and bears the weights of these upper filters, whereby the lowermost filter will relatively easily collapse. Namely, the stack of filters 98 will collapse from the bottom toward the top. When the overall height of the stack becomes smaller than required or desired, fresh filters are placed atop the stack.

Figure 7:
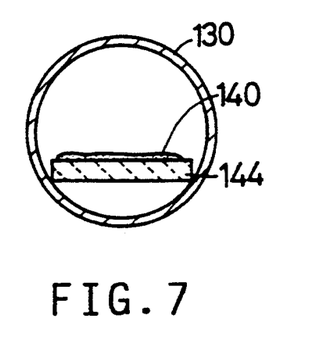
FIG. 7 is an elevational view in transverse cross section taken along line M—M of FIG. 5, when the layer of calcium hydroxide is disposed in the device.
Figure 8:
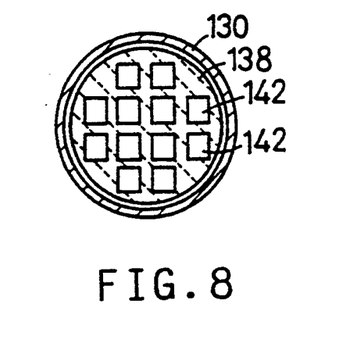
FIG. 8 is a view corresponding to that of FIG. 7, when the alkali filter specimen of the invention is disposed in the device of FIG. 5.
Figure 9:
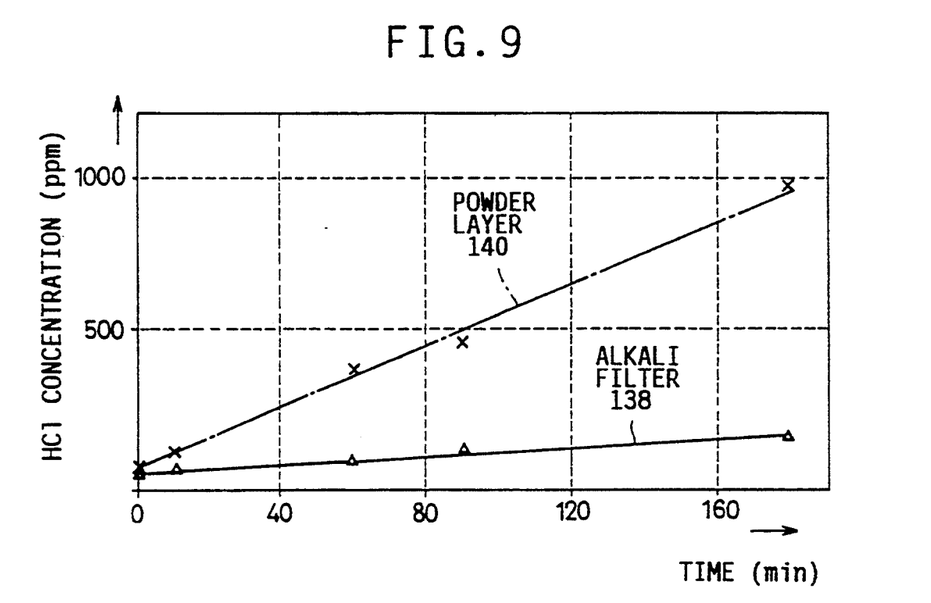
FIGS. 9, 10 and 11 are graphs indicating results of the experiments conducted using the device of FIG. 5.
Figure 10:
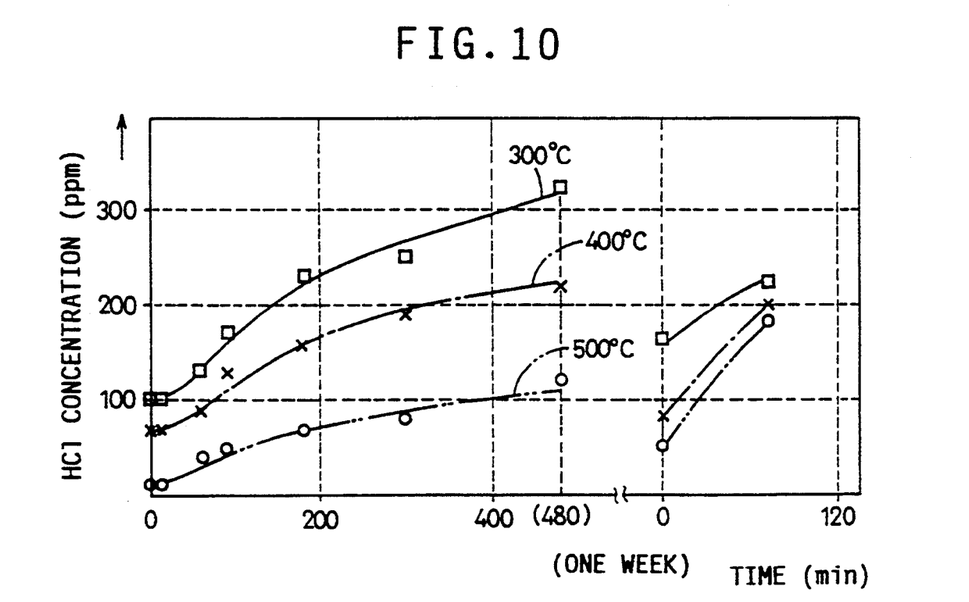
Figure 11:
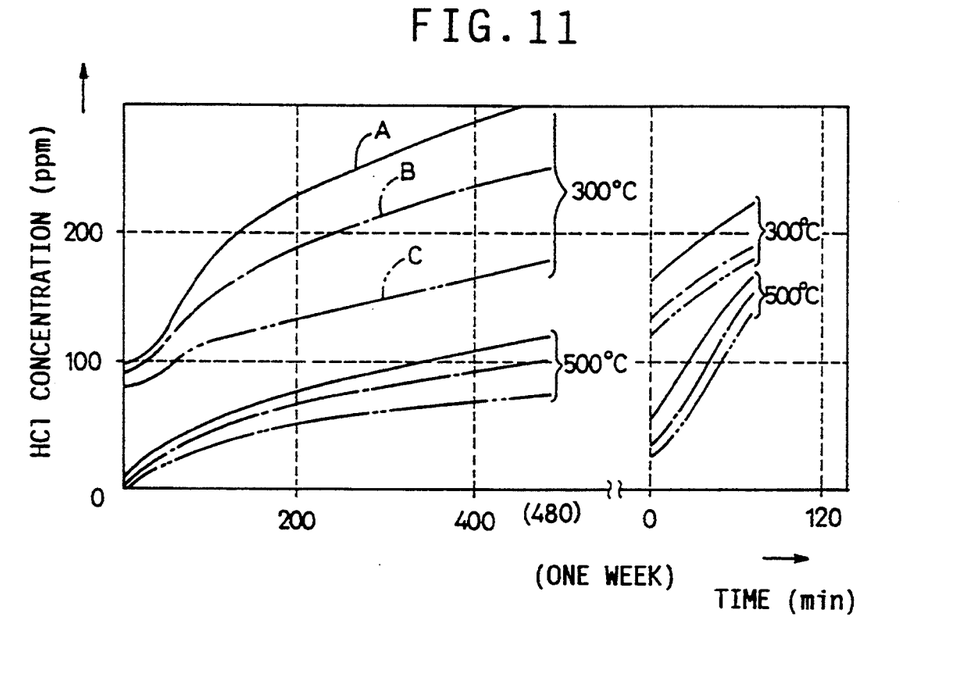

To confirm the capability of the alkali filter for removing hydrogen chloride, experiments were conducted using a device as shown in FIGS. 5-8. Results of the experiments are indicated in the graphs of FIGS. 9, 10 and 11 and in TABLE 2 below.

Referring to FIGS. 5-8, reference numeral 130 denotes a tube through which a stream of hydrogen chloride was passed in the experiments. The tube 130 is surrounded by a cylindrical heating furnace over a considerably large portion of the axial length. The furnace 132 has an outside diameter of 200 mm, while the tube 130 has an inside diameter of 80 mm. The tube 130 is connected at one end thereof to a device 134 for generating hydrogen chloride, and at the other end a device for detecting the concentration of hydrogen chloride.

Figure 5:
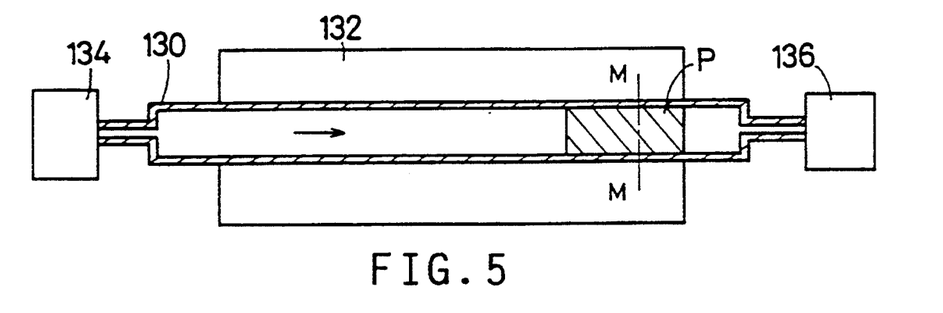
FIG. 5 is a view in longitudinal cross section of a device used in experiments to test a specimen of the alkali filter of FIG. 4, and a comparative specimen, for their abilities of removing a hydrogen chloride gas.
Figure 6:
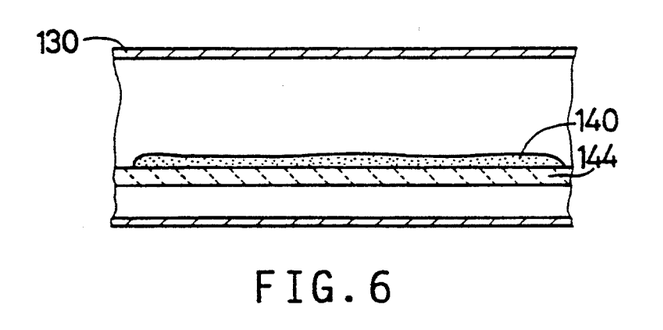
FIG. 6 is a fragmentary view in longitudinal cross section of a part P of the device of FIG. 5, in which a layer of calcium hydroxide powder is disposed as the comparative specimen.

The tube 130 has a portion P near the end connected to the device 136. In one test run of the device of FIG. 5, a specimen 138 of the alkali filter constructed according to the present invention was disposed in the portion P, as indicated in FIG. 8. In another test run, a layer 140 of calcium hydroxide powder as a comparative specimen was disposed in the portion P, as indicated in FIGS. 5 and 6. In the tests, a gas containing hydrogen chloride of 1000 ppm concentration produced from the device 134 was fed through the tube 130, and the concentration of hydrogen chloride left in the gas discharged from the tube 132 was measured by the device 136. The amount of hydrogen chloride absorbed by the alkali filter specimen 138 or the calcium hydroxide powder layer 140 can be calculated by subtracting the concentration of hydrogen chloride detected by the device 136, from the original concentration (1000 ppm) of hydrogen chloride contained the gas as produced from the device 134.

The specimen 138 is similar in construction as the filter 98 of the above embodiment, but is smaller in size than the filter 98. As illustrated in FIG. 8, the specimen 138 has apertures 142 with a square cross sectional shape each side being 10 mm long. The number of the apertures 142 is smaller than that of the apertures 120 of the filter 98. The specimen 138 has a thickness or axial dimension of about 40 mm, and a total weight of 62.5 g including 22.5 g of calcium hydroxide. The composition of the specimen 138 as Example A is indicated in TABLE 1.

TABLE 1

| Alkali Filters | A | B | C |
| --- | --- | --- | --- |
| Portland cement | 25 wt. % | 30 wt. % | 15 wt. % |
| Super-high-speed hardenable cement | | 10 wt. % | 10 wt. % |
| Anhydrite Type B | | 10 wt. % | 10 wt. % |
| Anhydrite Type A | 9 wt. % | | |
| Diatomaceous earth | 21 wt. % | | |
| Calcium hydroxide | 45 wt. % | 50 wt. % | 65 wt. % |
| Glass fiber* | 20 wt. % | 15 wt. % | 15 wt. % |
| Additive* | 10 wt. % | 10 wt. % | 10 wt. % |

*per 100 wt. % of the mixture of the cements, anhydrite,

The calcium hydroxide powder of the layer 140 has a maximum particle size of 20 μm. Using 15 g of this powder, the layer 140 was formed with a relatively small thickness, over an area of 119 cm² on a substrate 144 positioned within the tube 130 as shown in FIGS. 6 and 7, such that the thickness of the layer 140 was as uniform as possible. The substrate 144 has a width of 60 mm and a thickness of 10 mm. The layer 140 was positioned relatively near the axis of the tube 130, as indicated in FIG. 7.

In the first experiment, the 1000 ppm hydrogen chloride (HCl) gas was passed through the tube 130 at a flow rate of 13.8 cm/sec. in the test for the filter specimen 138 of the invention, and 4.36 cm/sec. in the test for the calcium hydroxide powder layer 140, while the temperature of the tube 130 was maintained at 400° C. by the heating furnace 132. The concentration values of the hydrogen chloride contained in the gas discharged from the tube 130 were detected by the device 136.

In the graph of FIG. 9, the detected HCl concentration is indicated in relation to the time of exposure to the specimen 138 or layer 140 to the HCl gas. The one-dot chain line indicates a test result on the layer 140, while the solid line indicates a test result on the specimen 138.

It will be understood from the graph of FIG. 9, the activity of reaction of the layer 140 with the HCl gas (acid gas) relatively rapidly decreased, while the reaction activity of the alkali filter specimen 138 of the present invention was maintained at a high level for a long period of time.

A second experiment was conducted to test the specimen 138 for a change in its capability of removing hydrogen chloride, at different temperatures. The test result is indicated in the graph of FIG. 10.

Generally, a chemical reaction tends to be promoted as the ambient temperature rises, but the chemical equilibrium constant tends to be lowered with a rise in the temperature. At an elevated temperature, therefore, a reaction in the reverse direction (CaCl$_2$+2H$_2$O→Ca(OH)$_2$+2HCl) tends to take place. Hence, the temperature for adequate chemical reaction is determined by a relationship between an increase in the reaction activity and a decrease in the chemical equilibrium constant.

In the graph of FIG. 10, the solid line indicates a result of a test conducted at 300° C., and the one-dot and two-dot chain lines indicate results of tests at 400° C. and 500° C., respectively. The graph shows that the activity of reaction of calcium hydroxide of the specimen 138 with hydrogen chloride is sufficiently high when the reaction temperature is not lower than 500° C.

After the second experiment was conducted for 480 minutes, the specimen 138 was left exposed to the ambient air for one week, and then a similar experiment was conducted. The graph of FIG. 10 shows that the reaction activity of the specimen 138 at the start of the second exposure to the HCl gas was more or less improved over that at the end of the first exposure one week before the second exposure. This recovery of the reaction activity is owing to the superficial collapse of the alkali filter specimen 138 during the one-week period, which caused a fresh portion of the calcium hydroxide to be exposed.

A third experiment was conducted to test the specimen 138 for a change in its capability with a change in the content of calcium hydroxide included in the alkali filter. In this experiment, three Examples A, B and C were used as test specimens. Of these specimens, Example A was used in the first and second experiments described above. The compositions of these three Examples are indicated in TABLE 1 above. The test result is indicated in the graph of FIG. 11.

It will be understood from the graph of FIG. 11 that Example C whose calcium hydroxide content is the highest exhibited the most excellent ability of removing hydrogen chloride. This tendency is substantially the same at the reaction temperatures of 300° C. and 500° C. employed in the test.

It appears that the reaction activity of the alkali filter with respect to hydrogen chloride increases with an increase in the content of calcium hydroxide, and that the collapsibility of the alkali filter increases with an increase in the reaction activity, that is, the decrease in the reaction activity is reduced as the collapsibility increases.

As in the second experiment, Examples A, B and C subjected to the first exposure to the HCl gas for 480 minutes in the third experiment were subjected to a second exposure to the HCl gas one week after the first exposure. The tendency as observed in the second experiment was also confirmed in the third experiment.

A fourth experiment was conducted on Example D which includes calcium hydroxide, and comparative Example E which does not calcium hydroxide. These Examples D and E were set in the testing device of FIG. 5, and the HCl gas was passed through the tube 130 at a flow rate of 17.8 cm/sec. for seven hours, while the tube 130 was maintained at 600° C. After the seven-hour exposure to the HCl gas, the specimens (Examples D and E) were checked to see if a structural collapse took place on the specimens. The compositions of the specimens and the test result are indicated in TABLE 2 below.

TABLE 2

| Filters | D | E |
| --- | --- | --- |
| Portland cement | 25 wt. % | 42 wt. % |
| Super-high-speed hardenable cement | 10 wt. % | 29 wt. % |
| Anhydrite Type B | 10 wt. % | 29 wt. % |
| Calcium hydroxide | 55 wt. % | None |
| Glass fiber* | 15 wt. % | 15 wt. % |
| Additive* | 10 wt. % | 10 wt. % |
| Collapsibility | Good | No collapse |

*per 100 wt. % of the cements, anhydrite, and calcium hydroxide

As is apparent from TABLE 2, Example E which does not include calcium hydroxide did not collapse, while Example E which includes calcium hydroxide collapsed. Example E was further subjected to an additional seven-hour exposure to the HCl gas, but did not collapse after a total of 14-hour exposure to the HCl gas.

Thus, it was confirmed that the collapse of the alkali filter according to the present invention occurred owing to the inclusion of calcium hydroxide in the body of the filter.

While the present invention has been described in detail in its presently preferred embodiment and examples with a certain degree of particularity, it is to be understood that the invention is not limited to the details of the illustrated embodiment and examples, but may be otherwise embodied.

For instance, the composition, size and shape of the alkali filter or acid gas remover, and the size, configuration and the number of the apertures formed through the filter are not confined to those of the filters 98, 138, but may be Preferably, the alkali filter is formed by using a mixture consisting of 40–70 wt. % of a calcium compound such as calcium hydroxide, and 25–65 wt. % of a binder including 15–35 wt. % of portland cement, 5–15 wt. % of super-high-speed hardenable cement and 5–15 wt. % of anhydrite. It is desirable to add 10–20 wt. % of glass fiber and 10–20 wt. % of additives, per 100 wt. % of the above mixture.

It is to be understood that the present invention may be embodied with various other changes, modifications and improvements, which may occur to those skilled in the art, without departing from the spirit and scope of the invention defined in the following claims.

What is claimed is:

1. A method of purifying combustion gases by removing acid gases therefrom, wherein a stream of combustion gases is caused to flow in contact with a surface of an acid gas remover formed from a mixture including a calcium compound for neutralizing said acid gases, and a binder for holding together particles of said calcium compound.

2. A method according to claim 1, wherein said combustion gases are produced by burning of waste materials.

3. An incinerator having a function of purifying combustion gases, having a combustion chamber, and a chimney for discharging the combustion gases produced in said combustion chamber, wherein the improvement comprises an acid gas remover formed from a mixture including a calcium compound for neutralizing said acid gases, and a binder for holding together particles of said calcium compound, said acid gas remover being disposed in a portion of a combustion gas passage between said combustion chamber and an outlet of said chimney, said acid gas remover having at least one opening through which a stream of said combustion gases flows.

4. An incinerator according to claim 3, wherein said acid gas remover consists of a stack of a plurality of planar members each having a plurality of apertures as said at least one opening formed through a thickness thereof, said plurality of planar members being stacked in a vertically extending portion of said combustion gas passage, so that said stream of the combustion gases from said combustion chamber flows through said stack of planar members in an upward direction toward said outlet of said chimney, said stack of said planar members gradually collapsing as a result of a reaction between said calcium compound and said acid gases.

5. An incinerator according to claim 4, wherein a lower end of said vertically extending portion of said combustion passage is defined by a shoulder surface which faces upward, said stack of the planar members is placed on said shoulder surface.

6. An incinerator according to claim 5, further comprising means for defining an opening through which said vertically extending portion of said combustion passage is accessible to install said stack of the planar members, and a closure member for closing and opening said opening.

7. An incinerator according to claim 3, further comprising means for defining an inlet through which waste materials are introduced into said combustion chamber, and an inlet door for closing and opening said inlet.

8. An acid gas remover for removing acid gases, which is formed from a mixture including a calcium compound for neutralizing said acid gases, and a binder for holding together particles of said calcium compound, said acid gas remover having at least one opening through which a stream of said combustion gases flows.

9. An acid gas remover according to claim 8, wherein said calcium compound comprises calcium hydroxide.

10. An acid gas remover according to claim 8, wherein said calcium compound comprises at least one of calcium hydroxide, calcium oxide and calcium carbonate.

11. An acid gas remover according to claim 8, wherein said binder comprises a cement.

12. An acid gas remover according to claim 8, wherein said mixture includes 40–70 wt. % of calcium hydroxide and 15–35 wt. % of portland cement.

13. An acid gas remover according to claim 12, wherein said mixture further includes 5–15 wt. % of super-high-speed hardenable cement, and 5–15 wt. % of anhydrite.

14. An acid gas remover according to claim 12, wherein an additive for improving a heat resistance of said acid gas remover is added to said mixture.

15. An acid gas remover according to claim 12, wherein an additive for improving the formability of said mixture is added to said mixture.

16. An acid gas remover according to claim 12, wherein a glass fiber is added to said mixture.

17. An acid gas remover according to claim 8, wherein said at least one opening consists of a plurality of substantially parallel apertures formed through said acid gas remover.

18. An acid gas remover according to claim 17, which is a planar member having said plurality of substantially parallel apertures formed through a thickness thereof.

* * * * *